United States Patent
Watanabe

(10) Patent No.: US 10,668,618 B2
(45) Date of Patent: Jun. 2, 2020

(54) MACHINE TOOL SYSTEM AND MOVING METHOD

(71) Applicant: FANUC CORPORATION, Yamanashi (JP)

(72) Inventor: Rikizou Watanabe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/933,458

(22) Filed: Mar. 23, 2018

(65) Prior Publication Data

US 2018/0272530 A1 Sep. 27, 2018

(30) Foreign Application Priority Data

Mar. 27, 2017 (JP) ................. 2017-060560

(51) Int. Cl.
*B23Q 41/06* (2006.01)
*B25J 9/00* (2006.01)
(Continued)

(52) U.S. Cl.
CPC .......... *B25J 9/1612* (2013.01); *B23Q 7/047* (2013.01); *B23Q 7/048* (2013.01); *B23Q 39/024* (2013.01); *B23Q 41/06* (2013.01); *B25J 9/0084* (2013.01); *B25J 9/0096* (2013.01); *B25J 9/1669* (2013.01); *B25J 9/1679* (2013.01); *B25J 9/1682* (2013.01); *B25J 11/005* (2013.01); *B25J 11/006* (2013.01); *B23Q 2220/002* (2013.01);
(Continued)

(58) Field of Classification Search
CPC ........ B23Q 2220/002; B23Q 2230/008; B23Q 39/024; B23Q 41/06; B23Q 7/047; B23Q 7/048; B25J 11/005; B25J 9/0084; B25J 9/0096; B25J 9/1612; B25J 9/1669; B25J 9/1679; B25J 11/0055; B25J 9/1682
See application file for complete search history.

(56) References Cited

U.S. PATENT DOCUMENTS 4,545,106 A * 10/1985 Juengel ................. G01B 7/003
29/563
4,637,121 A * 1/1987 Wortmann ........... B23K 11/318
29/26 A
(Continued)

FOREIGN PATENT DOCUMENTS

CN 103341778 A 10/2013
CN 203527473 U 4/2014
(Continued)

OTHER PUBLICATIONS

Untranslated Decision to Grant issued by Japan Patent Office (JPO) dated Dec. 25, 2018 in corresponding JP Application No. 2017-060560, 4 pgs.
(Continued)

*Primary Examiner* — Sara Addisu
(74) *Attorney, Agent, or Firm* — Fredrikson & Byron, P.A.

(57) ABSTRACT

A machine tool system includes: a machine tool that machines a workpiece by using a tool attached to a spindle; and a plurality of robots installed inside a machining space of the machine tool and adapted to grip the workpiece and move the workpiece in conformity with the machining performed by the machine tool.

3 Claims, 5 Drawing Sheets

(51) Int. Cl.
  *B25J 11/00* (2006.01)
  *B25J 9/16* (2006.01)
  *B23Q 7/04* (2006.01)
  *B23Q 39/02* (2006.01)

(52) U.S. Cl.
  CPC ............... *B23Q 2230/008* (2013.01); *G05B 2219/39105* (2013.01); *G05B 2219/39109* (2013.01); *G05B 2219/39117* (2013.01); *G05B 2219/39156* (2013.01); *Y10T 409/305768* (2015.01); *Y10T 409/305824* (2015.01)

(56) References Cited

U.S. PATENT DOCUMENTS

| | | | | |
|---|---|---|---|---|
| 4,821,402 | A * | 4/1989 | Kosho | B23O 3/101 483/20 |
| 5,031,490 | A * | 7/1991 | Grossmann | B23Q 7/045 29/36 |
| 5,056,964 | A | 10/1991 | Naka et al. | |
| 5,174,071 | A * | 12/1992 | Tommasini | B23Q 1/66 451/332 |
| 5,964,016 | A * | 10/1999 | Ito | B23C 3/18 279/14 |
| 9,914,189 | B2 * | 3/2018 | Burkhardt | B23Q 1/66 |
| 2002/0025757 | A1 * | 2/2002 | Gross | B23Q 7/047 451/5 |
| 2005/0055132 | A1 | 3/2005 | Matsumoto et al. | |
| 2005/0065654 | A1 | 3/2005 | Hariki et al. | |
| 2005/0159840 | A1 * | 7/2005 | Lin | B23P 6/002 700/245 |
| 2006/0048364 | A1 * | 3/2006 | Zhang | B23Q 17/0966 29/407.08 |
| 2011/0200406 | A1 * | 8/2011 | Lang | B23Q 7/047 483/31 |
| 2011/0288677 | A1 * | 11/2011 | Meidar | B25J 9/047 700/193 |
| 2015/0044944 | A1 * | 2/2015 | Chen | B24B 21/008 451/1 |
| 2015/0190896 | A1 | 7/2015 | Tanaka | |
| 2015/0283665 | A1 * | 10/2015 | Heilig | B24B 19/14 29/889.23 |
| 2016/0067782 | A1 * | 3/2016 | Fujimoto | B23B 3/065 483/19 |
| 2016/0167187 | A1 * | 6/2016 | Burkhardt | B23Q 3/155 409/172 |
| 2016/0332273 | A1 * | 11/2016 | Furuya | B23Q 7/047 |
| 2017/0232523 | A1 * | 8/2017 | Barozzi | B23B 3/22 82/1.11 |
| 2017/0348772 | A1 * | 12/2017 | Morimura | B23B 25/00 |
| 2018/0104826 | A1 * | 4/2018 | Kunisaki | B25J 15/009 |

FOREIGN PATENT DOCUMENTS

| | | | | |
|---|---|---|---|---|
| CN | 105773586 | A | | 7/2016 |
| CN | 106111834 | A | | 11/2016 |
| DE | 102011080457 | A1 | | 2/2013 |
| EP | 0115544 | A1 | | 8/1984 |
| EP | 0115544 | A4 | | 2/1986 |
| JP | 58066603 | A * | | 4/1983 ............... B23Q 1/48 |
| JP | 58192703 | A * | | 11/1983 ............. B23Q 7/048 |
| JP | 6268293 | A | | 3/1987 |
| JP | 01-193153 | A | | 8/1989 |
| JP | 04-159055 | A | | 6/1992 |
| JP | 04159055 | A * | | 6/1992 |
| JP | 06-036741 | U | | 5/1994 |
| JP | 7237162 | A | | 9/1995 |
| JP | 9300149 | A | | 11/1997 |
| JP | 2000-117669 | A | | 4/2000 |
| JP | 2003-145462 | A | | 5/2003 |
| JP | 2003-159683 | A | | 6/2003 |
| JP | 200581442 | A | | 3/2005 |
| JP | 2007-160437 | A | | 6/2007 |
| JP | 2007152502 | A | | 6/2007 |
| JP | 2008221413 | A | | 9/2008 |
| JP | 2013-233650 | A | | 11/2013 |
| JP | 2015-134407 | A | | 7/2015 |
| JP | 201616475 | A | | 2/2016 |
| JP | 2018126839 | A * | | 8/2018 ............... B25J 3/04 |
| WO | 2014/002250 | A1 | | 1/2014 |
| WO | 2015/075775 | A1 | | 5/2015 |
| WO | 2015/075778 | A1 | | 5/2015 |

OTHER PUBLICATIONS

English Machine Translation of Decision to Grant issued by Japan Patent Office (JPO) dated Dec. 25, 2018 in corresponding JP Application No. 2017-060560, 3 pgs.
Untranslated Notification of Reasons for Refusal issued by Japan Patent Office (JPO) dated Sep. 11, 2018 in corresponding JP Application No. 2017-060560, 8 pgs.
English Machine Translation of Notification of Reasons for Refusal issued by Japan Patent Office (JPO) dated Sep. 11, 2018 in corresponding JP Application No. 2017-060560, 6 pgs.
English Abstract and Machine Translation for Japanese Publication No. 62-068293 A, published Mar. 28, 1987, 7 pgs.
English Abstract and Machine Translation for Japanese Publication No. 09-300149 A, published Nov. 25, 1997, 10 pgs.
English Abstract and Machine Translation for Japanese Publication No. 2008-221413 A, published Sep. 25, 2008, 22 pgs.
English Abstract and Machine Translation for Japanese Publication No. 2016-016475 A, published Feb. 1, 2016, 15 pgs.
English Abstract and Machine Translation for Japanese Publication No. 2007-152502 A, published Jun. 21, 2007, 15 pgs.
English Abstract for Japanese Publication No. 2005081442 A, published Mar. 31, 2005, 1 pg.
English Abstract and Machine Translation for Japanese Publication No. 07-237162 A, published Sep. 12, 1995, 5 pgs.
English Abstract and Machine Translation for Japanese Publication No. 2013-233650 A, published Nov. 21, 2013, 9 pages.
English Machine Translation for Japanese Publication No. 06-036741 U, published May 17, 1994, 5 pages.
English Abstract and Machine Translation for Japanese Publication No. 2000-117669 A, published Apr. 25, 2000, 6 pages.
English Abstract and Machine Translation for Japanese Publication No. 2015-134407 A, published Jul. 27, 2015, 14 pages.
English Abstract for Japanese Publication No. 01-193153 A, published Aug. 3, 1989, 1 page.
English Abstract and Machine Translation for Japanese Publication No. 04-159055 A, published Jun. 2, 1992, 5 pages.
English Abstract for Japanese Publication No. 2003-145462 A, published May 20, 2003, 1 page.
English Abstract and Machine Translation for Japanese Publication No. 2003-159683 A, published Jun. 3, 2003, 11 pages.
English Abstract and Machine Translation for Japanese Publication No. 2007-160437 A, published Jun. 28, 2007, 21 pages.
English Abstract and Machine Translation for Chinese Publication No. 106111834 A, published Nov. 16, 2016, 13 pages.
English Abstract and Machine Translation for Chinese Publication No. 105773586 A, published Jun. 20, 2016, 13 pages.
English Abstract and Machine Translation for Chinese Publication No. 203527473 U published Apr. 9, 2014, 5 pages.
English Abstract and Machine Translation for Chinese Publication No. 103341778 A, published Oct. 9, 2013, 12 pages.
English Abstract and Machine Translation for German Publication No. 102011080457 A1, published Feb. 7, 2013, 16 pages.

\* cited by examiner

MACHINE TOOL SYSTEM AND MOVING METHOD

CROSS-REFERENCE TO RELATED APPLICATION

This application is based upon and claims the benefit of priority from Japanese Patent Application No. 2017-060560 filed on Mar. 27, 2017, the contents of which are incorporated herein by reference.

BACKGROUND OF THE INVENTION

Field of the Invention

The present invention relates to a machine tool system and a moving method for moving a target object to be processed during machining.

Description of the Related Art

Japanese Laid-Open Patent Publication No. 2007-152502 discloses an automatic machining system. Briefly explaining, the automatic processing system includes a plurality of manipulator-type articulated robots and controls the multiple manipulator-type articulated robots to perform conveyance and different kinds of machining in cooperation, having being assigned different tasks such as transportation and loading of a workpiece to a worktable, oblique hole drilling, curved surface cutting, and curved surface polishing.

SUMMARY OF THE INVENTION

Here, as a worktable for supporting a workpiece, one that moves the workpiece along a plane, one that turns around the workpiece, and the like have been generally known. That is, depending on the type of the worktable, the movement of the workpiece is limited. Therefore, if a workpiece is desired to be turned during machining in a machine tool equipped with a worktable that moves a workpiece along a plane, it is necessary to attach on the worktable an additional axis device for rotating the workpiece about a predetermined axis or to replace the worktable itself. Thus, attachment of the additional axis device or replacement of worktables requires a lot of work so that it takes time to prepare for machining.

It is therefore an object of the present invention to provide a machine tool system and a moving method for improving the flexibility or degree of freedom of movement of a workpiece to be machined.

A first aspect of the present invention resides in a machine tool system comprising: a machine tool that machines a workpiece by using a tool attached to a spindle; and a plurality of robots installed inside a machining space of the machine tool and adapted to grip the workpiece and move the workpiece in accordance with machining performed by the machine tool.

A second aspect of the present invention resides in a moving method for moving a workpiece to be machined by a tool attached to a spindle of a machine tool, comprising the steps of: holding the workpiece by a plurality of robots installed in a machining space of the machine tool; and moving the workpiece in accordance with the machining performed by the machine tool.

With this configuration, the flexibility (degree of freedom) of movement of the workpiece as well as the gripping force of the workpiece can be improved. Further, it is neither necessary to change the worktable that supports and moves the workpiece nor to attach an additional axis device on the worktable, so that the preparation work time for machining can be shortened. Moreover, the robots continue to hold the workpiece, it is unnecessary to perform clamping and unclamping by means of the clamping device, it is hence possible to prevent the machining cycle from becoming longer. Furthermore, since the robots are installed in the machining space, there is no need to provide a safety fence surrounding the robots, which reduces the cost.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A machine tool system and a moving method according to the present invention will be detailed hereinbelow by describing a preferred embodiment with reference to the accompanying drawings.

Figure 1:
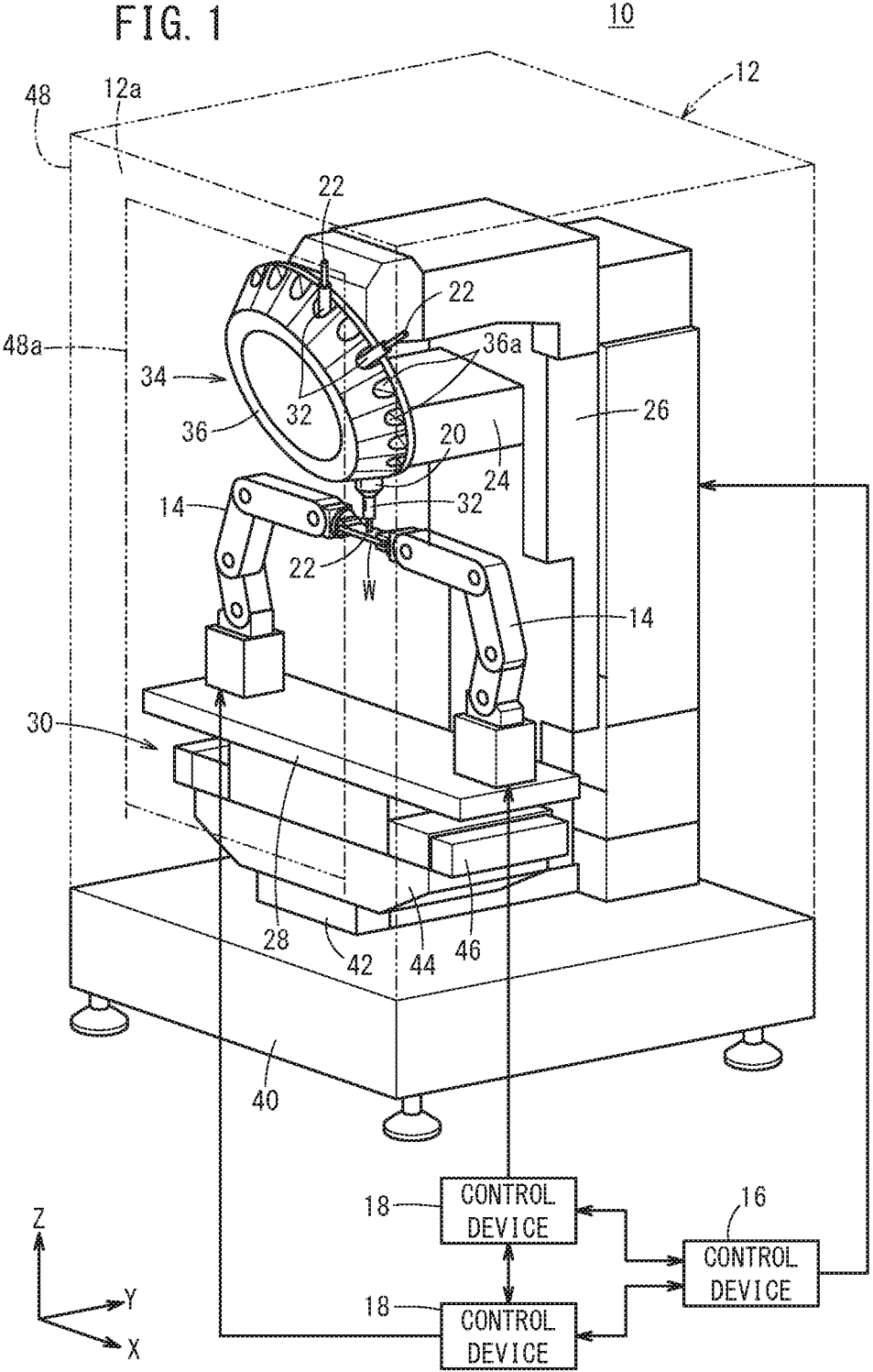
FIG. 1 is a diagram showing a configuration of a machine tool system according to an embodiment.
Figure 2:
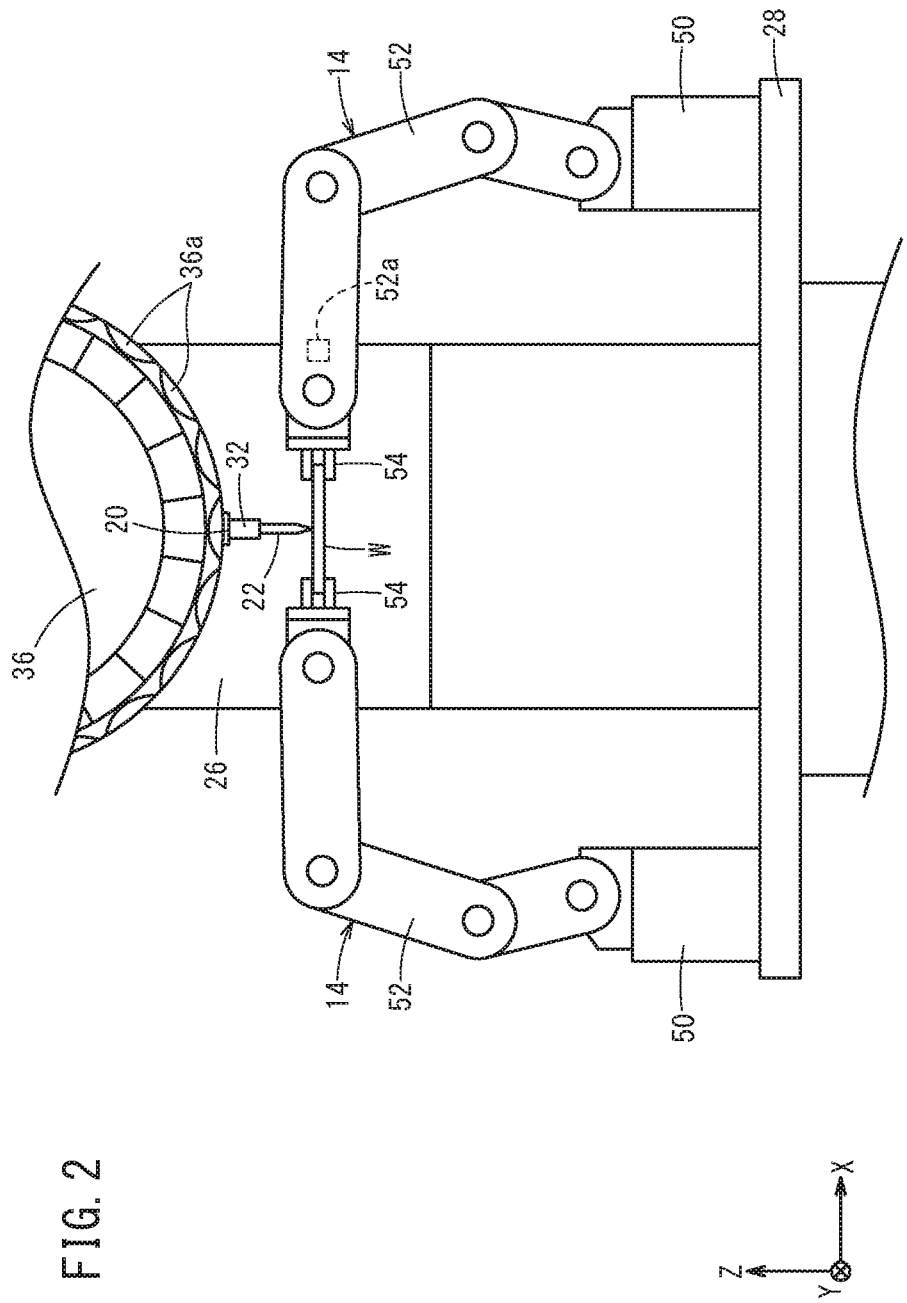
FIG. 2 is a partially enlarged view of a principal part of FIG. 1.

FIG. 1 is a diagram showing a configuration of a machine tool system 10 according to the embodiment, and FIG. 2 is a partially enlarged view of a principal part of FIG. 1. The machine tool system 10 comprises a machine tool 12 and two robots 14. A control device 16 is a controller for the machine tool 12, and a control device 18 is a controller for the robot 14. Since, in the present embodiment, the machine tool system 10 includes the two robots 14, two control devices 18 are provided. The control device 16 and the two control devices 18 can communicate with each other, and the two control devices 18 can also communicate with each other. It should be noted that the two control devices 18 may be formed as a single controller or that the control device 16 and the two control devices 18 may be given as a single controller.

The machine tool 12 machines a target object W to be machined (which will be referred to, hereinbelow, as a workpiece W) by a tool (cutting tool) 22 attached to a spindle 20. The machine tool 12 includes: the spindle 20; a spindle head 24 for rotationally driving the spindle 20 about a rotary axis parallel to the Z-direction; a column 26 for moving the spindle head 24 in the Z-direction (vertical direction); a table 28 arranged below the spindle 20 (on the negative Z-direction side) to support the two robots 14; and a table driver 30 for moving the table 28 in the X-direction and the Y-direction. Here, it is assumed that the X-direction, the Y-direction, and the Z-direction are ideally orthogonal to each other, and the gravity acts in the negative Z-direction. The two robots 14 are fixed on the table 28 immovably.

The tool 22 is held by a tool holder 32. The tool holder 32 is attachable to and detachable from the spindle 20 so that the tool 22 is attached to the spindle 20 via the tool holder 32. By inserting the tool holder 32 into a mounting hole (not shown) formed at the distal end of the spindle 20, the tool 22 is attached to the spindle 20. The tool 22 rotates together with the spindle 20.

The machine tool 12 is configured as a machining center in which the tool 22 attached to the spindle 20 can be replaced under the control of an automatic tool changer 34. The automatic tool changer 34 has a turret tool magazine 36. The tool magazine 36 has a plurality of grips 36a arranged in the circumferential direction. Each of the multiple grips 36a removably holds a tool 22 via the tool holder 32. Examples of the tool 22 may include a heel tool, a drill, an end mill, a milling cutter and the like.

Coupled to the spindle head 24 is an unillustrated Z-axis driving mechanism for moving the spindle head 24 relative to the column 26 in the Z-axis direction parallel to the Z-direction. The Z-axis driving mechanism has a servomotor and a power conversion mechanism (ball screw, nut, etc.) that converts the rotational motion of the servomotor into linier motion to transmit the motion to the spindle head 24. Further, the spindle 20 is rotated about the Z-axis by the drive of an unillustrated spindle motor installed in the spindle head 24. Further, the tool magazine 36 is rotated (turned) by an unillustrated turning motor.

The table driver 30 is supported by a base 40 supporting the column 26 or peripheral components. The table driver 30 includes a Y-axis slider 42, a saddle 44, and an X-axis slider 46. The saddle 44 is supported so as to be movable in the Y-direction with respect to the base 40 via the Y-axis slider 42. The table 28 is supported so as to be movable in the X-direction with respect to the saddle 44 via the X-axis slider 46.

An unillustrated Y-axis driving mechanism for moving the saddle 44 relative to the base 40 in the Y-axis direction parallel to the Y-direction is coupled to the saddle 44. Similarly, an unillustrated X-axis driving mechanism for moving the table 28 relative to the saddle 44 in the X-axis direction parallel to the X-direction is coupled to the table 28. The Y-axis driving mechanism and the X-axis driving mechanism each have a servomotor and a power conversion mechanism (ball screw, nut, etc.) for converting the rotational motion of the servomotor into linier motion and transmitting the motion to the saddle 44 and the table 28. As the Z-axis driving mechanism, the Y-axis driving mechanism and the X-axis driving mechanism, well-known mechanisms can be used. The turning motor, the spindle motor, and the servomotor for the Z-axis driving mechanism, the Y-axis driving mechanism, and the X-axis driving mechanism are controlled by the control device 16. The control device 16 controls these motors in accordance with an unillustrated machine tool program. This configuration enables the machine tool 12 to perform the machining of the workpiece W, replacement of tools, and other operations.

The machine tool 12 is equipped with a splash guard (splash cover) 48 that covers a machining space 12a in the machine tool 12 and prevents cutting chips (machining debris) generated during machining, and the cutting fluid from scattering around. The machine tool 12 is provided with a nozzle (not shown) that ejects the cutting fluid toward the tool 22 during machining. Though not illustrated, an opening is formed in the splash guard 48, and the splash guard 48 has an openable/closable door 48a for covering the opening. The opening of the splash guard 48 allows for replacing the workpiece W on the table 28. The door 48a is closed during machining and opened at the time of replacement of the workpiece W. The door 48a is opened and closed by the drive of an unillustrated actuator (motor). The control device 18 controls the driving of the actuator in accordance with the machine tool program.

The two robots 14 hold the workpiece W and move the workpiece W in conformity with the machining performed by the machine tool 12. The two robots 14 move in synchronism with each other to move the workpiece W to be machined. By holding the workpiece W by the two robots 14, the gripping force on the workpiece W is improved.

The machine tool 12 can perform 3-dimensional machining on the workpiece W with the rotation of the tool 22 (spindle 20) caused by the spindle motor and the movement of the workpiece W caused by the robot 14. During this machining, the machine tool 12 may move the tool 22 (spindle 20) in the Z-direction. In the present embodiment, the spindle 20 is movable in the Z-direction, but since the workpiece W can be moved in the Z-direction by the robot 14, it is also possible to make the spindle 20 unmovable in the Z-direction.

Here, in some cases the workpiece W may be larger than the range (stroke) in which the workpiece W can be moved by the two robots 14. However, since the two robots 14 are installed on the table 28, it is possible to machine the workpiece W appropriately by moving the table 28. When the stroke of the two robots 14 is wide enough with respect to the workpiece W, the two robots 14 do not need to be set on the table 28. In this case, two robots 14 may be installed on the base 40 or the installation surface on which the machine tool 12 is installed. However, it is still necessary to provide a splash guard 48 so that the splash guard 48 surrounds the machining space 12a and the two robots 14. In the case where the two robots 14 are not set on the table 28, the table 28 and the table driver 30 may be left out.

As shown in FIG. 2, the robot 14 is an articulated robot including a base portion 50 set on the top surface of the table 28 and an articulated arm 52 arranged on the base portion 50. A hand 54 as an end-effector is attached to the distal end of the articulated arm 52. The hand 54 grips a workpiece W to be machined. A plurality of joints of the articulated arm 52 are driven by unillustrated multiple servomotors (not shown). The control device 18 controls the posture of the robot 14 by controlling the multiple servomotors in accordance with a program for the robot or command signals sent from the control device 16. The two control devices 18 control the postures of the two robots 14 in synchronization with each other.

Figure 3:
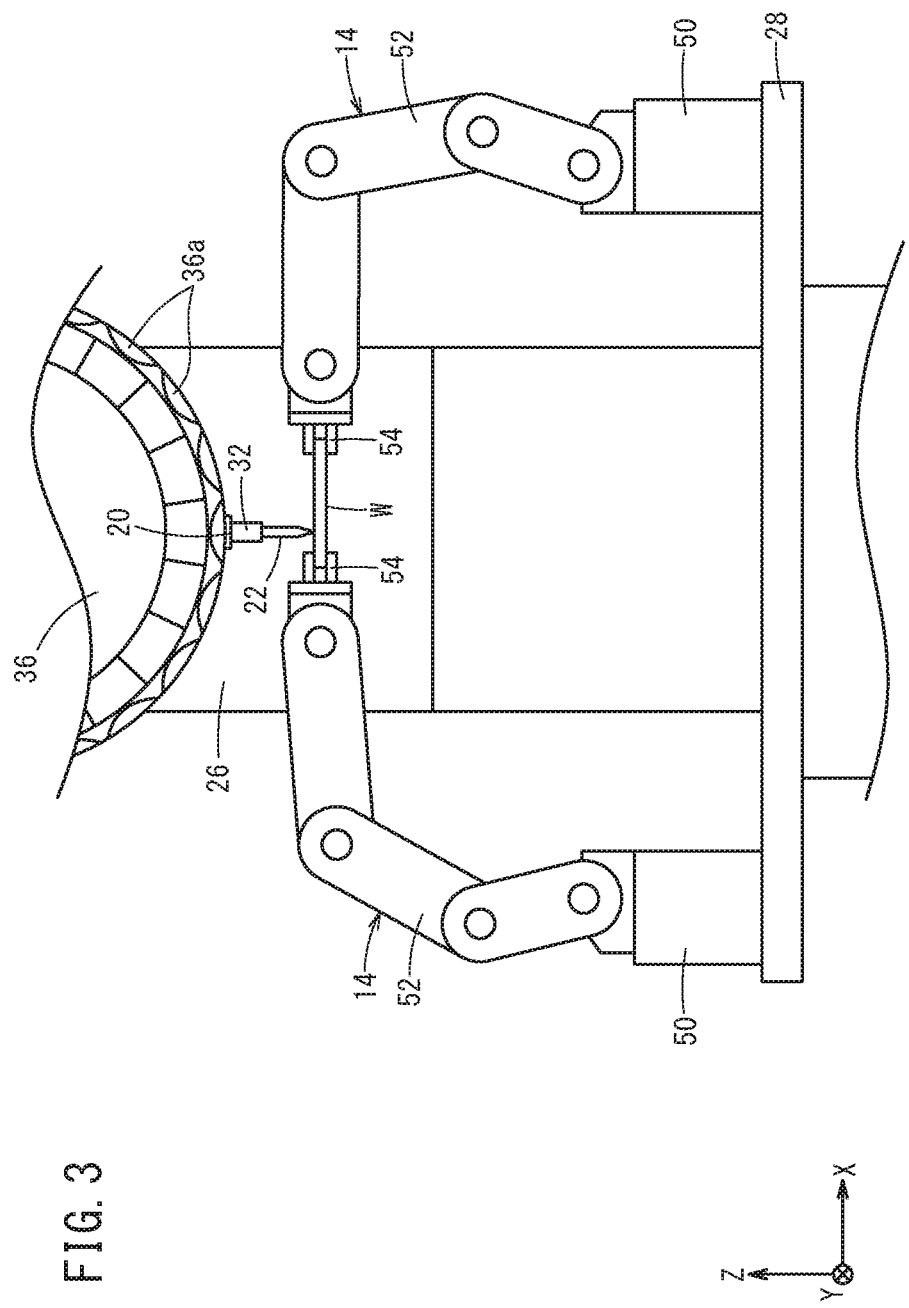
FIG. 3 is a diagram showing an example in which a workpiece is moved by two robots in the X-direction from the state shown in FIG. 2.

The two robots 14 change the position (for example, the position in the X-direction, the position in the Y-direction, the position in the Z-direction) of the workpiece W according to the machining by the machine tool 12. That is, the two robots 14 move the workpiece W in the X-direction, the Y-direction, and the Z-direction according to the machining performed by the machine tool 12. FIG. 3 is a diagram showing an example in which the workpiece W is moved by the two robots 14 in the X-direction from the state shown in FIG. 2.

Figure 4:
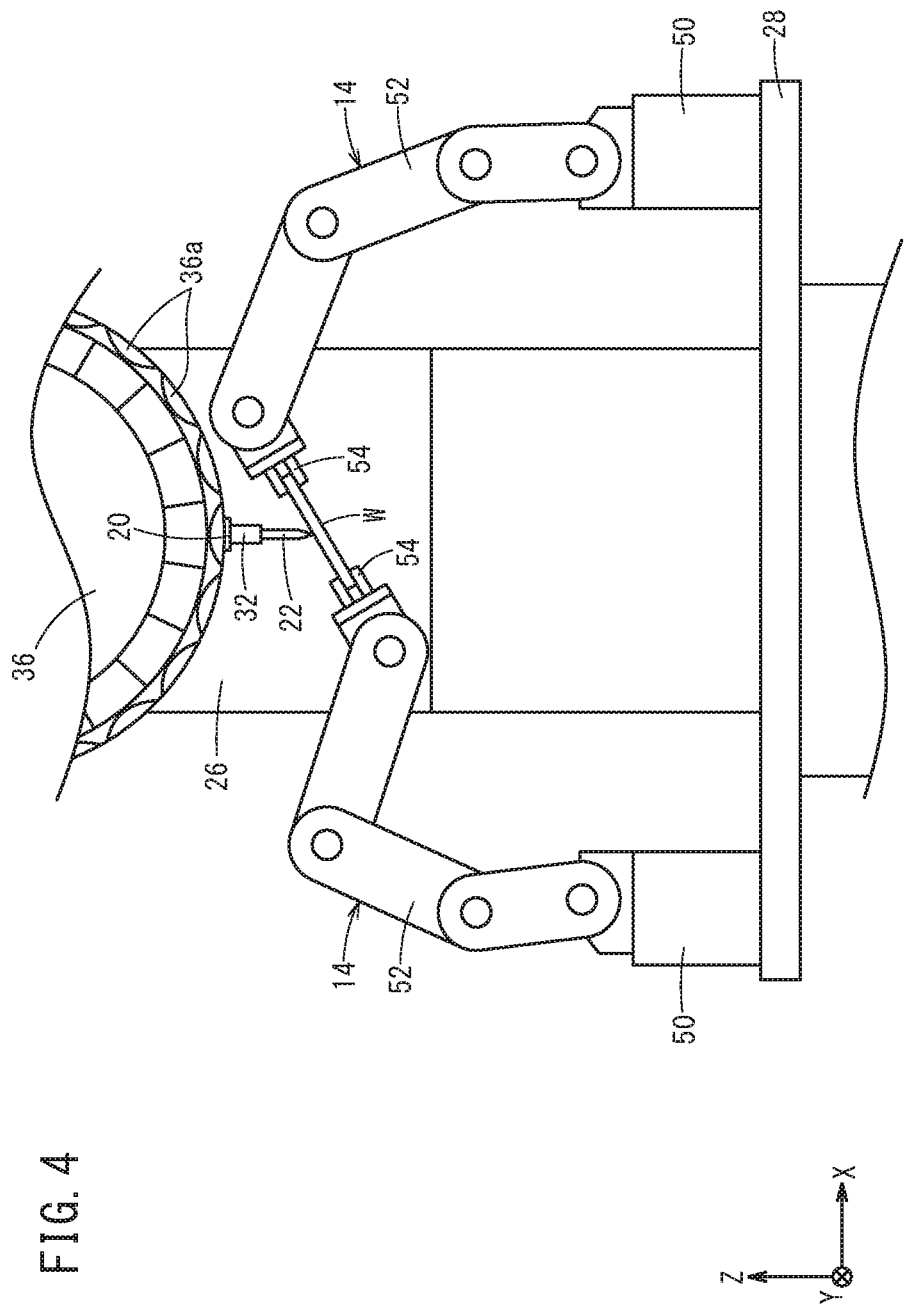
FIG. 4 is a diagram showing an example in which a workpiece is rotated by the two robots about an axis parallel to the Y-axis from the state shown in FIG. 2.

In addition, the two robots 14 change the posture of the workpiece W according to the machining by the machine tool 12. The two robots 14 rotate the workpiece W about a predetermined axis (for example, about an axis parallel to the X-direction, about an axis parallel to the Y-direction, about an axis parallel to the Z-direction) to change the posture of the workpiece W. FIG. 4 is a view showing an example in which the workpiece W is rotated by the two robots 14 about an axis parallel to the Y-direction from the state shown in FIG. 2.

Figure 5:
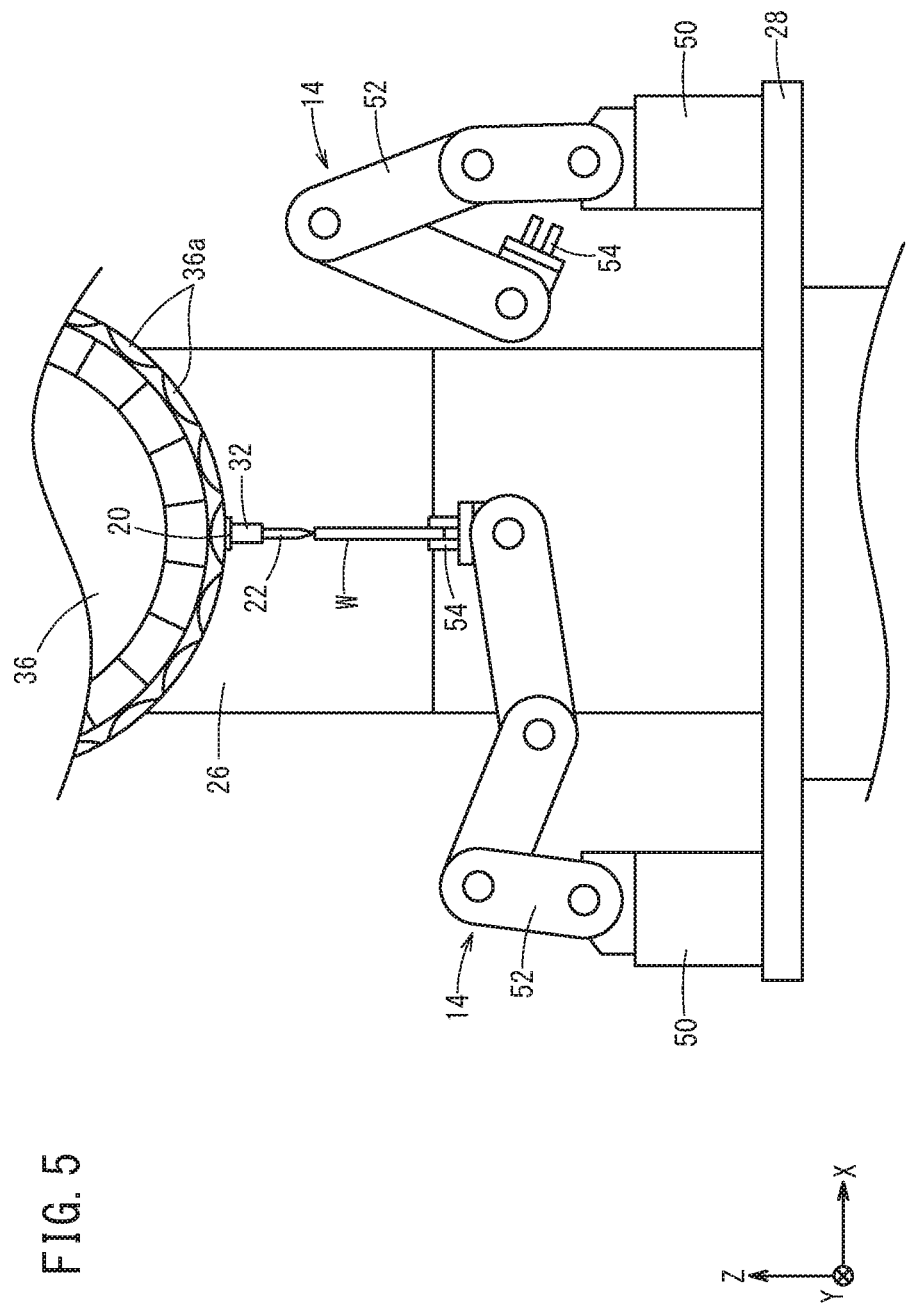
FIG. 5 is a view showing an example in which one of the two robots releases the gripping of the workpiece while the other robot is used to machine the workpiece.

Here, since the workpiece W is gripped by the hands 54 of the two robots 14, a portion of the workpiece W where the tool 22 and the robot 14 interfere with the workpiece W (for example, the part gripped by the hands 54) cannot be machined. To deal with this, one of the two robots 14 may stop holding the workpiece W, as shown in FIG. 5. Then, the other robot 14 holding the workpiece W may move (e.g., change the position and/or posture of) the workpiece W so that the part of the workpiece W which could not be accessed by the tool 22 due to the holding of the first robot 14 can be machined. Thus, it is possible to prevent occurrence of an event that part of the workpiece cannot be machined due to the holding of robots 14. Here, it should be noted that one of the robots 14 which has released the workpiece W may grip the workpiece W at a position different from the part that has been held.

When one of the two robots 14 releases the workpiece W, the robot 14 that released the workpiece W may change the hand 54 attached to the distal end of the articulated arm 52 to another end-effector so as to perform a predetermined work on the workpiece W. Examples of new end-effectors may include a deburring tool for removing burr from the workpiece W by the operation of the machine tool 12, a cleaning device for removing chips adhered on the workpiece W by the operation of the machine tool 12, and others. Accordingly, one robot 14 can perform a burr removal process or removing process while the workpiece W is held by the other robot 14 and machined. Here, the cleaning device may have a nozzle for ejecting liquid. In this way, it is possible to remove chips adhering on the workpiece W by means of the liquid ejected from the cleaning device.

Further, the two robots 14 may invert the workpiece W to be machined. That is, the two robots 14 may invert the workpiece W such that the upside of the workpiece W facing the tool 22 is oriented downward and the downside of the workpiece W is oriented upward facing the tool 22. Thereby, it is possible to machine the workpiece W with the posture of the workpiece W inverted.

For example, when the hand 54 can be rotated by an angle of 180 degrees or more about the axis of the distal part of the articulated arm 52, the two robots 14 rotate the hand 54 synchronously to turn the workpiece W upside down. If the hand 54 cannot turn about the axis of the distal part of the articulated arm 52 or is rotatable less than 180 degrees, one of the two robots 14 hand over the workpiece W to the other robot 14 so that the workpiece W can be turned upside down.

When the machining of the workpiece W is completed, one of the two robots 14 may bring out the machined workpiece W from the machining space 12a through the opening of the splash guard 48 exposed after the door 48a is opened. At this time, the robot 14 not engaged in conveyance of the machined workpiece W has released the machined workpiece W.

Further, one of the two robots 14 may bring a blank workpiece W from the outside of the machining space 12a into the machining space 12a through the opening of the splash guard 48.

The unloading of the machined workpiece W and the loading of the blank workpiece W may be performed by the same robot 14 or by a different robot 14. When one of the two robots 14 unloads the machined workpiece W and the other robot 14 loads the blank workpiece W, it is also possible to perform loading and unloading in parallel. This enables the loading and unloading operations to be performed at the same time or in the same period of time, so that the time required for loading and unloading the workpiece W can be shortened.

In a conventional configuration, a transport device such as the robot 14 places the workpiece W on the worktable and the workpiece W placed on the worktable is clamped (fixed) by an unillustrated clamp device. Therefore, the control device 16 of the machine tool 12 had to check whether or not the workpiece W is correctly clamped by means of a sensor or the etc., arranged in the clamping device. Further, since it was necessary after completion of machining to take the machined workpiece W out of the machining space 12a, the clamping device was required to unclamp or stop clamping the workpiece so that the transport device could take out the workpiece W sitting on the worktable to the outside of the machining space 12a. Thus, the conventional configuration required a longer machining cycle due to the clamping and unclamping of the clamping device.

In contrast, in the present embodiment, since the robots 14 continue to hold the workpiece W, it is unnecessary to perform clamping and unclamping by means of the clamping device, it is thus possible to prevent the machining cycle from becoming longer.

In addition, since the workpiece W is held by the two robots 14 and moved in conformity with the machining performed by the machine tool 12, the flexibility (degree of freedom) of movement of the workpiece W is improved, the gripping force of the workpiece W being improved as well. Further, it is neither necessary to change the worktable that supports and moves the workpiece W nor to attach an additional rotary device for rotating the workpiece W about a predetermined axis to the worktable, so that it is possible to shorten the preparation work time for machining. Moreover, since the robots 14 are installed in the machining space 12a, there is no need to provide a safety fence surrounding the robots 14, which reduces the cost.

For the sake of description simplicity, the above embodiment has been described by giving an example in which the two robots 14 are provided in the machine tool system 10. However, the number of robots 14 does not matter as long as two or more robots 14 are provided. As the number of the robots 14 increases, the force of gripping the workpiece W increases.

Further, as shown in FIG. 2, the robot 14 has a force sensor 52a for sensing the force acting on the articulated arm 52. The machine tool 12 may change the machining conditions or stop machining when the force detected by the force sensor 52a falls out of a predetermined permissible range. Specifically, the force data detected by the force sensor 52a is output to the control device 16 via the control device 18. The control device 16, based on the acquired force data, performs an automatic alteration control of the machining conditions or controls the stopping of machining. Thereby, it is possible to prevent the tool 22 from being broken and the machine accuracy from deteriorating.

[Technical Ideas Obtained from the Embodiments]

Technical ideas that can be grasped from the above embodiment will be described below.

<First Technical Idea>

A machine tool system (10) includes: a machine tool (12) that machines a workpiece (W) with a tool (22) attached to a spindle (20); and a plurality of robots (14) installed inside a machining space (12a) of the machine tool (12) and adapted to grip the workpiece (W) and move the workpiece (W) in accordance with the machining performed by the machine tool (12).

With this configuration, the flexibility (degree of freedom) of movement of the workpiece (W) as well as the gripping force of the workpiece (W) can be improved. Further, it is neither necessary to change the worktable that supports and moves the workpiece (W) nor to attach an additional axis device on the worktable, so that the preparation work time for machining can be shortened. Moreover, since the robots (14) continue to hold the workpiece (W), it is unnecessary to perform clamping and unclamping by means of the clamping device, it is hence possible to prevent the machining cycle from becoming longer. Furthermore, since the robots (14) are installed in the machining space (12a), there is no need to provide a safety fence surrounding the robots (14), which reduces the cost.

The multiple robots (14) may be configured to change the position of the workpiece (W) in accordance with the machining performed by the machine tool (12). Thereby, the flexibility (degree of freedom) of movement of the workpiece (W) is improved.

The multiple robots (14) may be configured to change the attitude of the workpiece (W) in conformity with the machining performed by the machine tool (12). As a result, the flexibility of movement of the workpiece (W) is improved.

The machine tool (12) may include a table (28) adapted to move along a plane orthogonal to the axial direction of the spindle (20). The multiple robots (14) may be installed on the table (28). Thus, even when the workpiece (W) is larger than the range (stroke) in which the workpiece (W) can be moved by the two robots (14), it is possible to machine the workpiece (W) appropriately.

<Second Technical Idea>

A moving method for moving a workpiece (W) to be machined by a tool (22) attached to a spindle (20) of a machine tool (12) comprises the steps of: holding the workpiece (W) by a plurality of robots (14) installed in a machining space (12a) of the machine tool (12); and moving the workpiece (W) in accordance with the machining performed by the machine tool (12).

With this configuration, the flexibility of movement of the workpiece (W) as well as the gripping force of the workpiece (W) can be improved. Further, it is neither necessary to change the worktable that supports and moves the workpiece (W) nor to attach an additional rotary device on the worktable, so that the preparation work time for machining can be shortened. Moreover, the robots (14) continue to hold the workpiece (W), it is unnecessary to perform clamping and unclamping by means of the clamping device, it is hence possible to prevent the machining cycle from becoming longer. Furthermore, since the robots (14) are installed in the machining space (12a), there is no need to provide a safety fence surrounding the robots (14), which reduces the cost.

The multiple robots (14) may change the position of the workpiece (W) in accordance with the machining performed by the machine tool (12). Thereby, the flexibility (degree of freedom) of movement of the workpiece (W) is improved.

The multiple robots (14) may change the posture of the workpiece (W) in accordance with the machining performed by the machine tool (12). Thereby, the flexibility (degree of freedom) of movement of the workpiece (W) is improved.

The multiple robots (14) may rotate the workpiece (W) about a predetermined axis to change the posture of the workpiece (W) in accordance with the machining performed by the machine tool (12).

At least one of the multiple robots (14) may release the workpiece (W). The remaining one or multiple robots (14) holding the workpiece (W) may move the workpiece (W) so that a portion of the workpiece (W) having been blocked by the robot (14) can be machined by the tool (22). In this way, it is possible to avoid some areas not being machined due to gripping of the robots (14).

When at least one of the multiple robots (14) releases the workpiece (W), the robot (14) after releasing the workpiece (W) may change end-effectors and perform a predetermined process on the workpiece (W). In this way, it possible to effectively utilize the robot (14) which has released the workpiece (W), whereby the machining cycle time is shortened.

The predetermined process may be a deburring process for removing burr created in the workpiece (W) as the machine tool (12) machines the workpiece (W), or a cleaning process for removing cutting chips adhered to the workpiece (W) during the machine tool (12) machines the workpiece (W). As a result, deburring or cleaning can be performed during the machining.

The multiple robots (14) may invert the workpiece (W). In this way, it is possible to machine the workpiece (W) with the workpiece (W) inverted.

At least one of the multiple robots (14) may carry the machined workpiece (W) out of the machining space (12a). As a result, the robot (14) having been gripping the workpiece (W) takes the workpiece (W) out, so that the time of the machining cycle can be shortened.

At least one of the multiple robots (14) may bring a blank workpiece (W) into the machining space (12a). As a result, the robot (14) having brought the workpiece (W) in continues gripping the workpiece (W) and moves the workpiece (W), so that it is possible to shorten the machining cycle time.

The robot (14) that carries the machined workpiece (W) out and the robot (14) that brings the blank workpiece (W) in may be operated in parallel to perform loading and unloading operations at the same time. Thereby, it is possible to shorten the time taken to load and unload the workpiece (W), whereby the machining cycle time is shortened.

The machine tool (12) may include a table (28) configured to move along a plane orthogonal to the axial direction of the spindle (20). The multiple robots (14) may be installed on the table (28). Thus, even when the workpiece (W) is larger than the range (stroke) in which the workpiece (W) can be moved by the two robots (14), it is possible to machine the workpiece (W) appropriately.

The present invention is not limited in particular to the embodiments described above, and further various modifications are possible without departing from the essence and gist of the present invention.

What is claimed is:

1. A machine tool system comprising:
   a machine tool that machines a workpiece by using a tool attached to a spindle, wherein the machine tool comprises a table configured to move along a plane orthogonal to an axial direction of the spindle; and
   a plurality of robots installed on the table inside a machining space of the machine tool, wherein each of the plurality of robots is able to work independently of one another wherein each of the plurality of robots is adapted to either grip and move the workpiece or not grip and move the workpiece in response to a machining operation to be performed by the machine tool,
   wherein the plurality of robots is adapted to work in conjunction with one another to both grip and move the workpiece in response to the machining operation to be performed by the machine tool while the tool machines the workpiece.

2. The machine tool system according to claim 1, wherein the plurality of robots are configured to change a position of the workpiece in response to a machining operation to be performed by the machine tool.

3. The machine tool system according to claim 1, wherein the plurality of robots are configured to change a posture of the workpiece in response to a machining operation to be performed by the machine tool.

* * * * *